(12) United States Patent
Lee et al.

(10) Patent No.: US 7,725,408 B2
(45) Date of Patent: May 25, 2010

(54) APPARATUS AND METHOD FOR CONSTRUCTING LEARNING DATA

(75) Inventors: Chang Ki Lee, Daejeon (KR); Ji Hyun Wang, Daejeon (KR); Hyeon Jin Kim, Busan (KR); Chung Hee Lee, Daejeon (KR); Hyo Jung Oh, Daejeon (KR); Myung Gil Jang, Daejeon (KR); Young Jik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 799 days.

(21) Appl. No.: 11/633,190

(22) Filed: Dec. 4, 2006

(65) Prior Publication Data

US 2007/0143284 A1 Jun. 21, 2007

(30) Foreign Application Priority Data

Dec. 9, 2005 (KR) .................. 10-2005-0120977

(51) Int. Cl.
*G06F 15/18* (2006.01)
(52) U.S. Cl. ........................................ 706/12
(58) Field of Classification Search .................. 706/12
See application file for complete search history.

(56) References Cited

U.S. PATENT DOCUMENTS

| | | | | |
|---|---|---|---|---|
| 6,925,601 B2 * | 8/2005 | Moore et al. | ................. | 715/707 |
| 7,296,018 B2 * | 11/2007 | Abe et al. | ..................... | 707/6 |
| 7,412,093 B2 * | 8/2008 | Chung et al. | ................. | 382/181 |
| 7,542,894 B2 * | 6/2009 | Murata | ......................... | 704/9 |
| 7,630,978 B2 * | 12/2009 | Li et al. | ......................... | 707/5 |
| 7,668,718 B2 * | 2/2010 | Kahn et al. | ................. | 704/270 |

FOREIGN PATENT DOCUMENTS

| | | |
|---|---|---|
| JP | 2000-311165 | 11/2000 |
| JP | 2004-094434 | 3/2004 |

(Continued)

OTHER PUBLICATIONS

Unsupervised Adaptation of a Stochastic Language Model Using a Japanese Raw Corpus, Kurata, G.; Mori, S.; Nishimura, M.; Acoustics, Speech and Signal Processing, 2006. ICASSP 2006 Proceedings. 2006 IEEE International Conference on vol. 1 Digital Object Identifier: 10.1109/ICASSP.2006.1660201 Publication Year: 2006, pp. I-I.*

(Continued)

*Primary Examiner*—Michael B Holmes
(74) *Attorney, Agent, or Firm*—Ladas & Parry LLP

(57) ABSTRACT

An apparatus and method for efficiently constructing learning data required in statistical methodology used in information retrieval, information extraction, translation, natural language processing, etc. are provided. The method includes the steps of: generating learning models by performing machine learning with respect to learning data; attaching tags to a raw corpus automatically by using the generated learning models to thereby generate learning data candidates; calculating confidence scores of the generated learning data candidates, and then selecting a learning data candidate using the confidence scores; and allowing a user to correct an error in the selected learning data candidate through an interface and adding the error-corrected learning data candidate to the learning data, thereby adding new learning models incrementally.

9 Claims, 7 Drawing Sheets

FOREIGN PATENT DOCUMENTS

| | | |
|---|---|---|
| JP | 2004-171575 | 6/2004 |
| KR | 10-2001-0028946 | 4/2001 |
| KR | 10-2001-0081770 | 8/2001 |
| KR | 10-2002-0084944 | 11/2002 |
| KR | 1020020084944 | 11/2002 |
| KR | 10-2005-0039379 | 4/2005 |
| KR | 1020050036541 | 4/2005 |

OTHER PUBLICATIONS

Automatic Technical Term Extraction Based on Term Association, Miao Wan; Song Liu; Jian-Yi Liu; Cong Wang; Fuzzy Systems and Knowledge Discovery, 2008. FSKD '08. Fifth International Conference on vol. 2 Digital Object Identifier: 10.1109/FSKD.2008.40 Publication Year: 2008 , pp. 19-23.*

A Model for Chinese Sentence Ordering Based on Markov Model, Yanxiang He; Gongfu Peng; Weidong Wen; Fuzzy Systems and Knowledge Discovery, 2009. FSKD '09. Sixth International Conference on vol. 7 Digital Object Identifier: 10.1109/FSKD.2009.489 Publication Year: 2009 , pp. 457-461.*

Culotta, A., et al., "Reducing labeling effort for structured prediction tasks." 2006. *American Associate for Artificial Intelligence.*

Kristjansson, T., et al., "Interactive Information Extraction with Constrained Conditional Random Fields." 2004. *American Association for Artificial Intelligence.*

Tur, G., et al., "Active Learning for Spoken Language Understanding." 2003. *IEEE, ICASSP,* 0-7803-7663-3/03, pp. I-276-I-279.

Collins, M., et al., "Unsupervised Models for Named Entity Classification." AT&T Labs Research.

* cited by examiner

APPARATUS AND METHOD FOR CONSTRUCTING LEARNING DATA

CROSS-REFERENCE TO RELATED APPLICATION

This application claims priority to and the benefit of Korean Patent Application No. 2005-120977, filed Dec. 9, 2005, the disclosure of which is incorporated herein by reference in its entirety.

BACKGROUND OF THE INVENTION

1. Field of the Invention

The present invention relates to an apparatus and method for constructing learning data, capable of efficiently constructing learning data required in statistical methodology used in information retrieval, information extraction, translation, natural language processing, etc.

2. Description of the Related Art

Statistical methodology is currently used in information retrieval, information extraction, translation, natural language processing, etc. The statistical methodology requires construction of learning data according to each task, and the more learning data is constructed, the higher the performance.

An example of learning data with regard to a morpheme analysis of natural language processing and named entity recognition is described below.

Text 1: Eoje isunsin janggungwa maleul haetda (Korean transliteration of "I had a conversation with General Sun-shin Lee yesterday")

Morpheme analysis: Eoje/nc isunsin/nc janggun/nc+gwa/jj mal/nc+eul/jc ha/pv+eot/ep+da/ef./s Text 2: Hanguk∘Ilbon∘Manju∘Usurigang deungjie bunpohanda (Korean transliteration of "It is distributed in Korea∘Japan∘Manchuria∘Usuri River")

Named Entity Recognition: <Hanguk:LCP.COUNTRY>∘<Ilbon:LCP.COUNTRY>∘<Manju:LC.OTHERS>∘<Usurigang:LCG.RIVER> deungjie btnpohanda.

Also, an example of learning data with regard to information extraction is described below.

Text 3: Hanyangdaehakgyo songsimon gyosunimeul mosigo "biochipeul iyonghan sample jeoncheori"e daehan naeyongeuro jeonmunga chocheong seminareul gaechoihagojahamnida (Korean transliteration of "We will hold an expert seminar entitled "Sample Pretreatment using Biochip" with professor Si-mon Song of Hanyang University")

Information Extraction: <Hanyangdaehakgyo: lecturer. where the lecturer is from>∘<songsimongyosunimeul:lecturer.career> eul mosigo <"biochipeul iyonghan sample jeoncheori":seminar. a title>e daehan naeyongeuro jeonmunga chocheong seminareul gaechoihagojahamnida However, as the construction of learning data requires a great deal of time and effort, a learning data shortage often occurs.

Conventional methods of overcoming such learning data shortages are classified into three methodologies.

A first methodology involves using a workbench supporting an auto tagging function by means of machine learning. This method is similar to the present invention in supporting the auto tagging function, however, it does not support a function of gradually, automatically enhancing auto tagging performance by selecting a learning data candidate or reusing error-corrected data to increase the total amount of learning data.

A second methodology includes a bootstrapping method or a co-training method. These methods are similar to the present invention in supporting a function of enhancing learning data by automatically tagging the learning data, however, the methods do not support functions of correcting an error in an auto tagging result and selecting a learning data candidate. Also, in these methods, it takes considerable time to repeatedly perform machine learning because batch learning is used. Also, these methods have the disadvantage of performance deterioration due to inclusion of errors in auto tagging results.

A third methodology is an active learning method. Such a method is similar to the present invention in obtaining high performance with a small quantity of learning data constructed by selecting an optimal learning data candidate after generating learning models from initial learning data, and adopting the generated models to a raw corpus. However, it takes considerable time to repeatedly perform machine learning because batch learning is used. In particular, this method has the problem of learning time increasing with each repetition as the to amount of learning data increases.

SUMMARY OF THE INVENTION

The present invention is directed to an apparatus and method for semi-automatically constructing learning data capable of reducing cost and time consumed in constructing learning data by automatically attaching tags to generate learning data candidates, calculating confidence scores, and selecting a learning data candidate by using machine learning to effectively construct learning data.

The present invention is also directed to an apparatus and method for semi-automatically constructing learning data capable of reducing leaning time by performing incremental learning using only newly added learning data, thus overcoming a problem of learning time increasing in proportion to learning data.

In accordance with an aspect of the present invention, a method for constructing learning data is provided. The method for constructing learning data comprises the steps of: (a) generating learning models by performing machine learning with respect to the learning data, (b) attaching tags to a raw corpus automatically using the generated learning models, and generating learning data candidates, (c) calculating confidence scores of the generated learning data candidates and selecting a learning data candidate using the calculated confidence scores, and (d) allowing a user to correct an error in the learning data candidate selected through an interface, adding the error-corrected learning data candidate to the learning data thereby incrementally increasing new learning models.

Steps (a) through (d) may be performed repeatedly with respect to the added learning data.

Step (b) may comprise the steps of: generating features from sentences included in the raw corpus, after inferring a plurality of answers by applying a plurality of learning models to the generated features; determining an answer sentence by voting on the answers; and generating learning data candidates by attaching the tags to the determined sentence.

Step (c) may comprise the steps of: calculating the confidence scores of the automatically generated learning data candidates using the plurality of inferred answers generated from the plurality of learning models; and selecting a specific learning data candidate by using the calculated confidence scores of the learning data candidates.

The confidence scores of the learning data candidates may be calculated by means of a committee-based method using the plurality of inferred answers provided by the plurality of learning models.

The candidate may be selected by using one of two methods, i.e., an active learning method that selects a candidate sequentially beginning with a candidate having the lowest confidence score, and a bootstrapping method that selects a candidate beginning with a candidate having the highest confidence score.

Step (d) may comprise the steps of: allowing a user to correct an error using a GUI tool when the generated specific learning data candidate is is provided; and adding the newly corrected learning data to the conventional teaming data, thereby generating the initial learning models.

In accordance with another aspect of the present invention, an apparatus for constructing learning data to accomplish the objectives is provided. The apparatus for constructing learning data comprises an incremental learning unit generating new learning models from the learning data by using machine learning, an automatic tag attaching unit generating learning data candidates by attaching tags to a raw corpus automatically by using the generated learning models, a learning data candidate selecting unit calculating confidence scores of the generated learning data candidates to thereby select a learning data candidate, and a manual error correcting unit providing a user with the selected learning data, and providing an interface to the user to correct an error.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail with reference to the accompanying drawings. In the following description, matters related to the present invention and well-known among those of ordinary skill in the art will not be described in detail in order to keep the disclosure of the invention concise.

Figure 1:
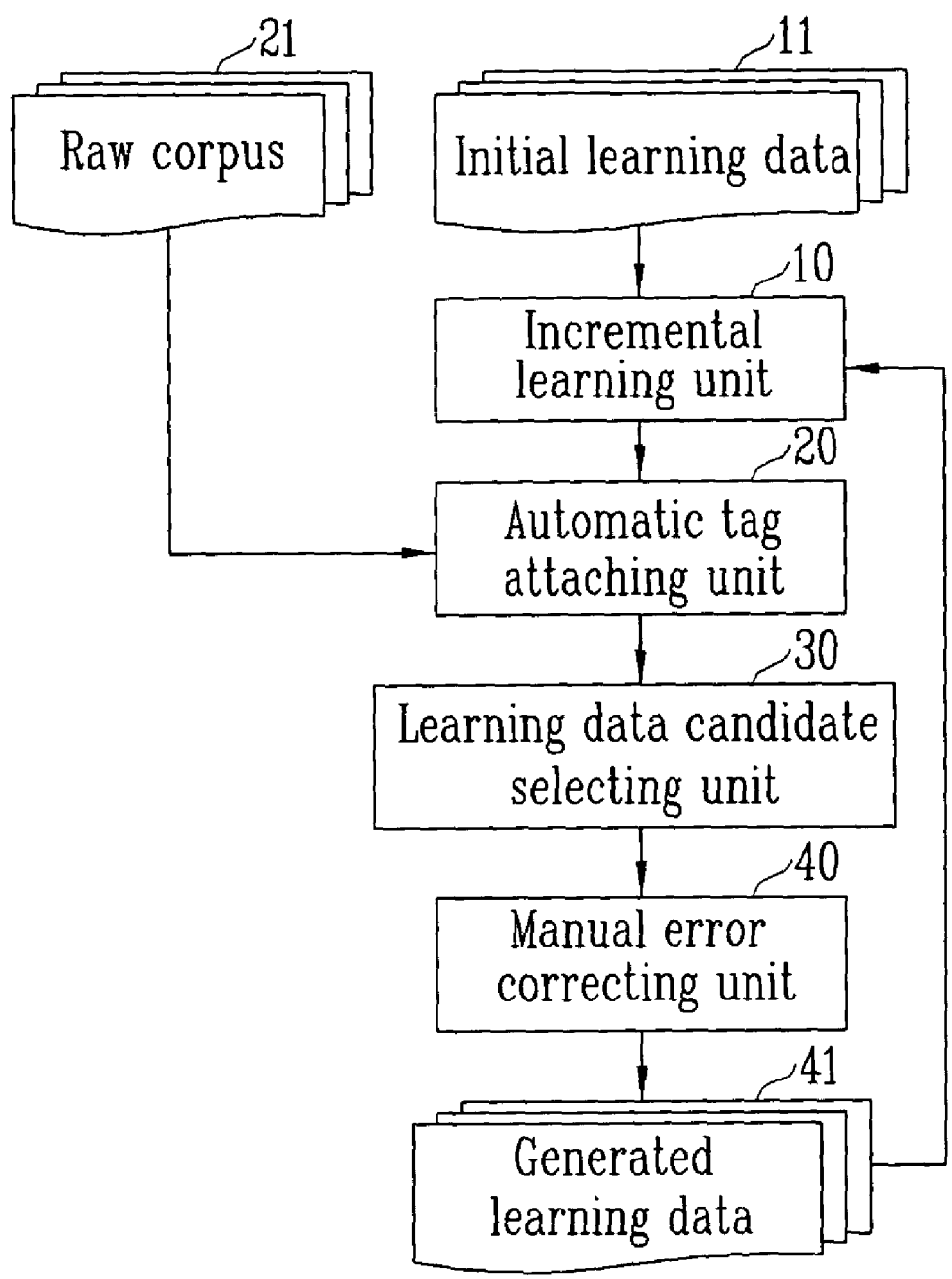
FIG. 1 illustrates the configuration of an apparatus for constructing learning data according to an exemplary embodiment of the present invention.

FIG. 1 illustrates the configuration of an apparatus for constructing learning data according to an exemplary embodiment of the present invention.

As illustrated in FIG. 1, the apparatus comprises an incremental learning unit 10 performing incremental learning from initial learning data 11 to thereby generate a plurality of learning models, an automatic tag attaching unit 20 attaching tags to a raw corpus 21 automatically using the plurality of generated learning models to thereby generate learning data candidates, a learning data candidate selecting unit 30 calculating confidence scores of the automatically generated learning data candidates to thereby select a learning data candidate, and an error correcting unit 40 allowing a user to add learning data 41 using the learning data candidates to which tags are attached automatically.

Here, the incremental learning unit 10 generates features to be used in machine learning from sentences included in the learning data when the initial learning data or the added learning data is provided, and then generates a plurality of learning models by means of incremental learning using the generated features.

Also, the automatic tag attaching unit 20 generates features from sentences included in a raw corpus, determines an answer by voting on a plurality of inferred answers to which the generated features and the plurality of learning models are applied, and attaches tags to the sentences automatically thereby generating learning data candidates. Here, the raw corpus refers to a collection of various texts and linguistic resources including text-based and voice-based information.

Further, the learning data candidate selecting unit 30 calculates confidence scores of the automatically generated learning data candidates, at which time the confidence scores may be calculated by a committee-based method using inferred answers generated from the plurality of learning models, and selects a learning data candidate using the confidence scores of the candidates.

Operations of an apparatus for semi-automatically constructing learning data according to the present invention will be described below in detail with reference to the accompanying drawings.

Figure 2:
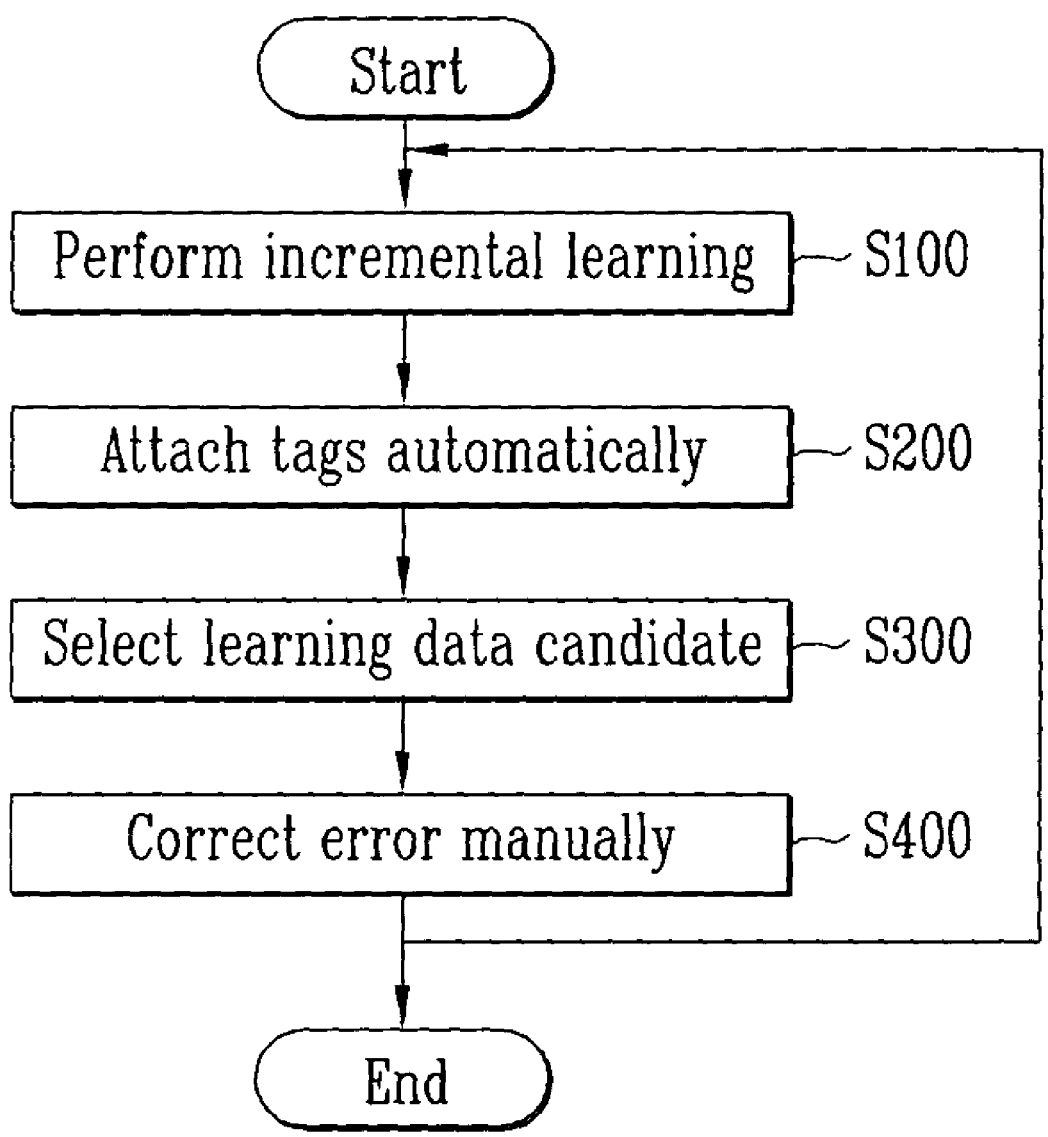
FIG. 2 is a flowchart illustrating a method for constructing learning data according to an exemplary embodiment of the present invention.

FIG. 2 is a flowchart illustrating a method for constructing learning data according to an exemplary embodiment of the present invention.

Referring to FIG. 2, in step S100, learning models are generated using incremental learning after generating features from initial learning data 11 in the incremental learning unit 10.

Then, in step S200, the automatic tag attaching unit 20 generates learning data candidates by attaching tags to a raw corpus 21 automatically by means of the generated learning models.

Subsequently, in step S300, the learning data candidate selecting unit 30 calculates confidence scores of learning data candidates, and selects a specific learning data candidate by using the calculated confidence scores.

In step S400, the manual error correcting unit 40 provides a user with the specific learning data candidate generated as above, and then the user corrects an error using a Graphical User Interface (GUI) tool, thereby enhancing the learning data. Then, the enhanced data 41 is delivered to the incremental learning unit 10 to conduct incremental learning with respect to the added learning data.

Repetition of these operations heightens the accuracy of automatic tagging incrementally and enhances the learning data.

Figure 3:
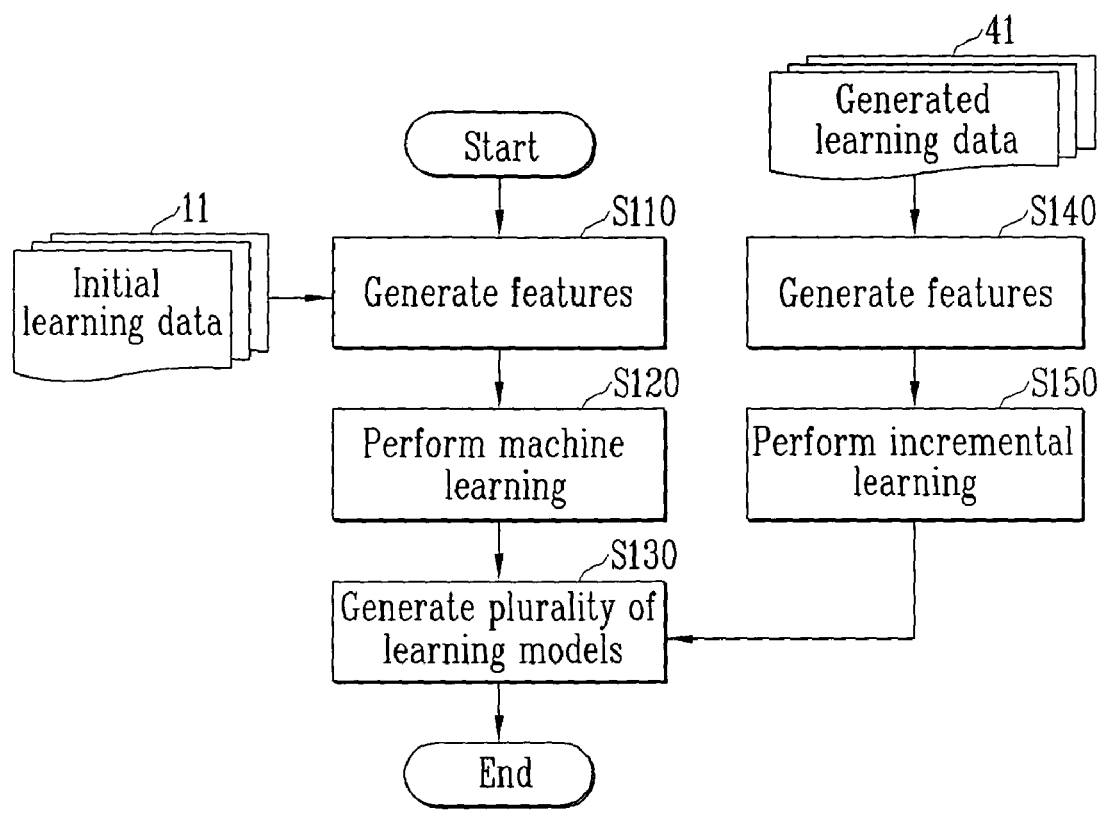
FIG. 3 is a flowchart illustrating detailed operations of an incremental learning unit in a method for constructing learning data according to an exemplary embodiment of the present invention.

FIG. 3 is a flowchart illustrating detailed operations of an incremental learning unit in a method for constructing learning data according to an exemplary embodiment of the present invention.

Referring to FIG. 3, in step S110, a first feature is generated to be used in machine learning from the learning data when initial learning data 1 is provided. Then, in step S120, learning is performed by means of a machine learner using the generated first feature. Then, in step S130, initial learning models are generated.

The learning data is generated using the generated initial learning models through the automatic tag attaching unit 20, the learning data candidate selecting unit 30, and the manual error correcting unit 40 in FIG. 1, and a second feature is generated from the generated learning data 41 in the incremental learning unit 10 again, in step S140.

Performing incremental learning using the second feature generated as above generates another learning model, in step S150.

In addition, in step S130, a plurality of learning models are configured along with conventional learning models.

At this time, when incremental learning is performed using newly generated learning data 41, in step S140, if a base learner supports the incremental learning or online learning, the incremental learning is performed using the generated learning data along with the conventional learning models. However, since most base learners do not support incremental learning, another model is generated by learning using only newly generated data. Then, answers are inferred using the plurality of models in the automatic tag attaching unit 20 in FIG. 1 by configuring the plurality of learning models with the conventional models.

In other words, the conventional art currently uses a base learner having high-performance Maximum Entropy and Conditional Random Fields, but such a base learner does not support incremental learning.

However, the method used in the present invention yields the same effect as incremental learning by generating other learning models using only newly generated learning data without using all learning data, even when the conventional base learner is used as a base learner. According to this method, learning time may be reduced.

The following is an embodiment of features and learning models used for chunking of natural language processing.

Text: Hangukeui sejonggijiwa geu jubyeon sejong giji (Korean transliteration of "King Sejong Station in Korea and around King Sejong Station") to Chunking learning data: <Hangukeui sejonggijiwa:NP><geu jubyeon sejong giji:NP>

Generated Chunking Features (Answer) (Feature) (Feature) . . . .

B-NP word=Hanguk word+1=eui tag=MP tag+1=j

I-NP word=eui word−1=Hanguk word+1=sejong tag−1=MP tag=j tag+1=MP

I-NP word=sejong word−1=eui word+1=giji tag−1=j tag=MP tag+1=MC

I-NP word=giji word−1=sejong word+1=wa tag−1=MP tag=MC tag+1=j

I-NP word=wa word−1=giji word+1=geu tag−1=MC tag=j tag+1=G

I-NP word=wa word−1=giji word+1=geu tag−1=MC tag=j tag+1=G

B-NP word=geu word−1=wa word+1=jubyeon tag−1=j tag=G tag+1=MC

I-NP word=jubyeon word−1=geu word+1=sejong tag−1=G tag=MC tag+1=MP

I-NP word=sejong word−1=jubyeon word+1=giji tag−1=MC tag=MP tag+1=MC

I-NP word=giji word−1=sejong tag−1=MP tag=MC

Generated Learning Models:

| (Feature) | (Answer) | (Feature Weight) |
|---|---|---|
| word = Hanguk | B-NP | 0.733384 |
| word = Hanguk | II-NP | 0.0277564 |
| word = Hanguk | O | −0.387011 |
| word − 1 = Hanguk | B-NP | 0.528912 |
| word − 1 = Hanguk | I-NP | 0.0375574 |
| word − 1 = Hanguk | O | −0.423916 |
| . . . | | |

B-NP, and I-NP, the first information of the generated chunking features in the above exemplary embodiment, refer to a Begin-Noun-Phrase of NP chunk and an Inside-Noun Phrase of NP chunk, respectively.

Figure 4:
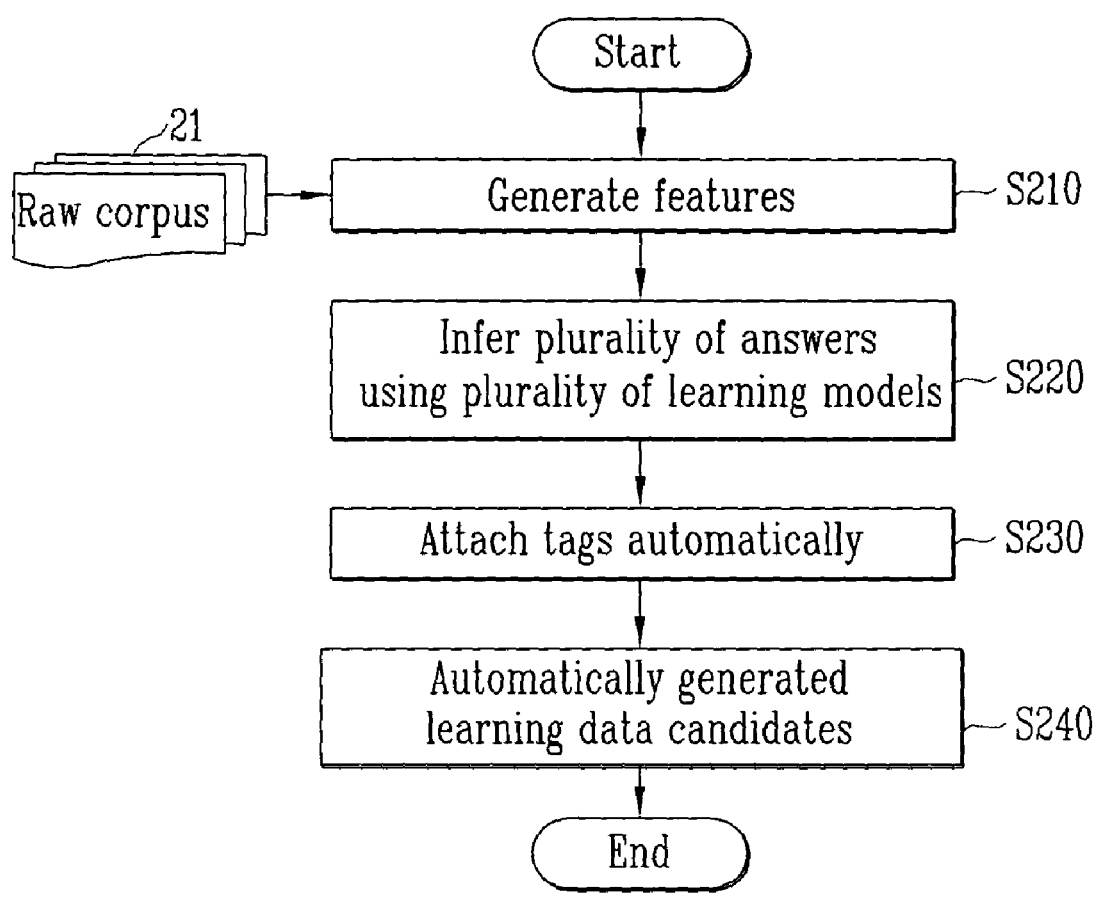
FIG. 4 is a flowchart illustrating detailed operations of an automatic tag attaching unit in the method for constructing learning data according to an exemplary embodiment of the present invention.

FIG. 4 is a flowchart illustrating detailed operations of an automatic tag attaching unit in a method for constructing learning data according to the present invention.

Referring to FIG. 4, features are generated from sentences included in a raw corpus 21, in step S210.

Then, a plurality of answers are inferred by applying a plurality of learning models to the generated features, and an answer is determined by voting on the inferred answers, in step S220. Next, tags are attached to the sentence automatically, in step S230, and learning data candidates are generated, in step S240.

An embodiment of the features and the learning data candidates to be used in chunking of the natural language processing is described below.

Raw corpus sentence: Arhentinaeui jugiji (Korean transliteration of "Main station in Argentina")

Generated Features (Feature) (Feature)

word=Arhentina word+1=eui tag=MP tag+1=j word=eui word+1=Arhentina tag−1=MP tag=j tag+1=MP word=jugiji word−1=eui tag−1=j word+1=neun tag=MP tag+1≠j Inferring answers using a plurality of learning models (in the case when there are three learning models)

| (Morpheme) | (Model1) | (Model2) | (Model3) | (Voting result) |
|---|---|---|---|---|
| Arhentina | B-NP | I-NP | B-NP | B-NP |
| Eui | I-NP | I-NP | I-NP | I-NP |
| Jugiji | O | I-NP | I-NP | I-NP |

| Attaching automatic tags (B-NP, I-NP, O) | |
|---|---|
| (Morpheme) | (tag) |
| Arhentina | B-NP |
| eui | I-NP |
| jugiji | I-NP |

Generated learning data candidates: <Arhentinaeui jugiji: NP>

Figure 5:
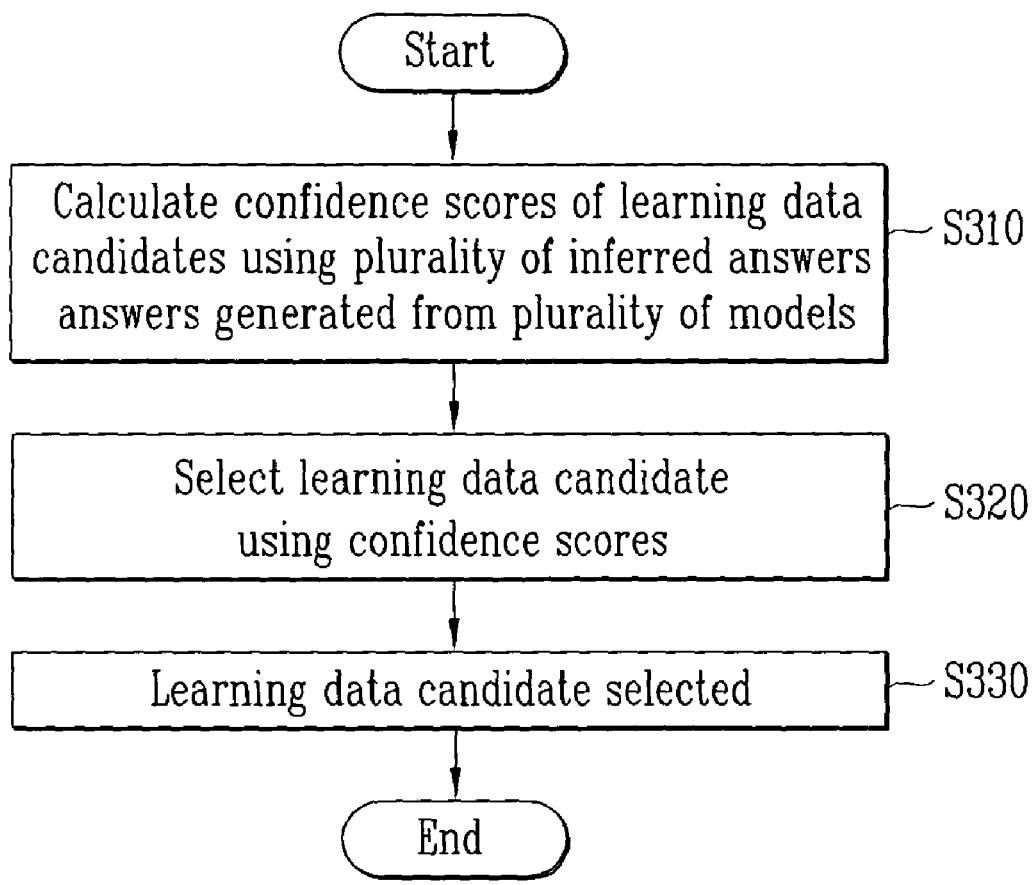
FIG. 5 is a flowchart illustrating detailed operations of an automatic tag attaching unit in the method for constructing learning data according to an exemplary embodiment of the present invention.

FIG. 5 is a flowchart illustrating detailed operations of an automatic tag attaching unit in a method for constructing learning data according to an exemplary embodiment of the present invention.

Referring to FIG. 5, in step S310, firstly, confidence scores of the automatically generated learning data candidates are calculated using inferred answers generated from a plurality of learning models.

Then, in step S320, a learning data candidate is selected using the calculated confidence scores of the learning data candidates. Then, the selected learning data candidate is input to a manual error correcting unit 40, in step S330.

At this time, there are different methods of calculating the confidence scores of the learning data candidates. Generally, a probability value provided by a base learner and a variety of information are used to calculate the confidence scores. Preferably, the confidence score is calculated using a committee-based method since the plurality of inferred answers are provided using the plurality of learning models in the present invention.

In selecting a candidate using the confidence scores, when an active learning methodology is used, the candidate is selected beginning with a candidate having the lowest confidence score, and when a bootstrapping methodology is used, the candidate is selected beginning with a candidate having the highest confidence score.

Generally, it is preferred that the active learning methodology is used since it enables high performance to be maintained with a small number of learning data candidates.

Figure 7:
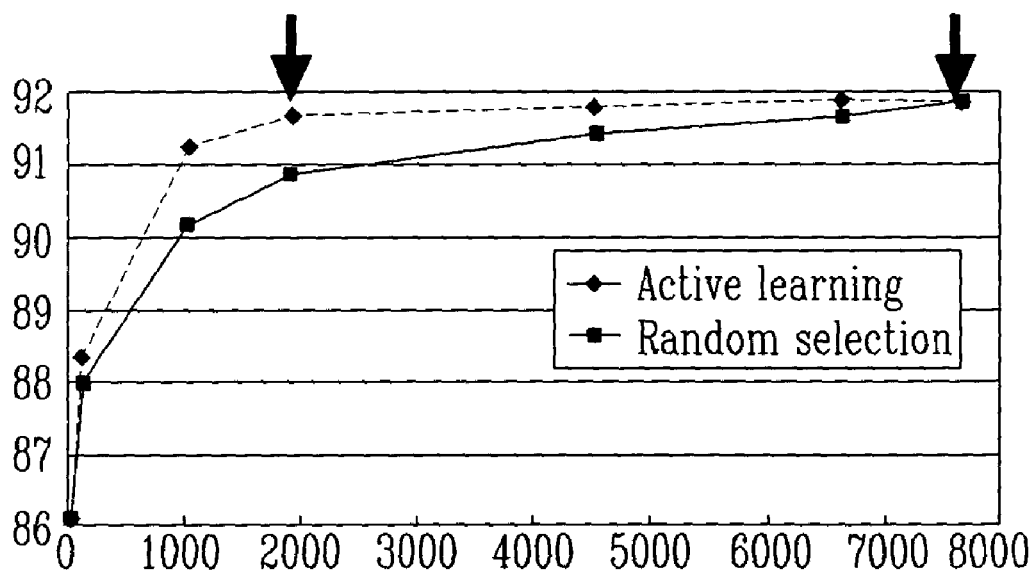
FIG. 7 illustrates an embodiment of actual use of an active learning methodology in the field of information extraction in the method for constructing learning data according to an exemplary embodiment of the present invention.

FIG. 7 is an embodiment of an active learning methodology actually used in the field of information extraction in a method for constructing learning data according to an exemplary embodiment of the present invention.

Accuracy of information extraction is plotted versus amount of learning data. A dotted line denotes selecting a learning data candidate using active learning, and a solid line denotes selecting learning data at random.

As illustrated in FIG. 7, active learning requires 2,000 pieces of learning data to achieve around 91.7% performance, whereas random selection requires quadruple that amount of learning data—8,000 pieces of learning data.

Therefore, selecting learning data by using active learning can reduce the quantity of learning data constructed up to around 75%.

Figure 6:
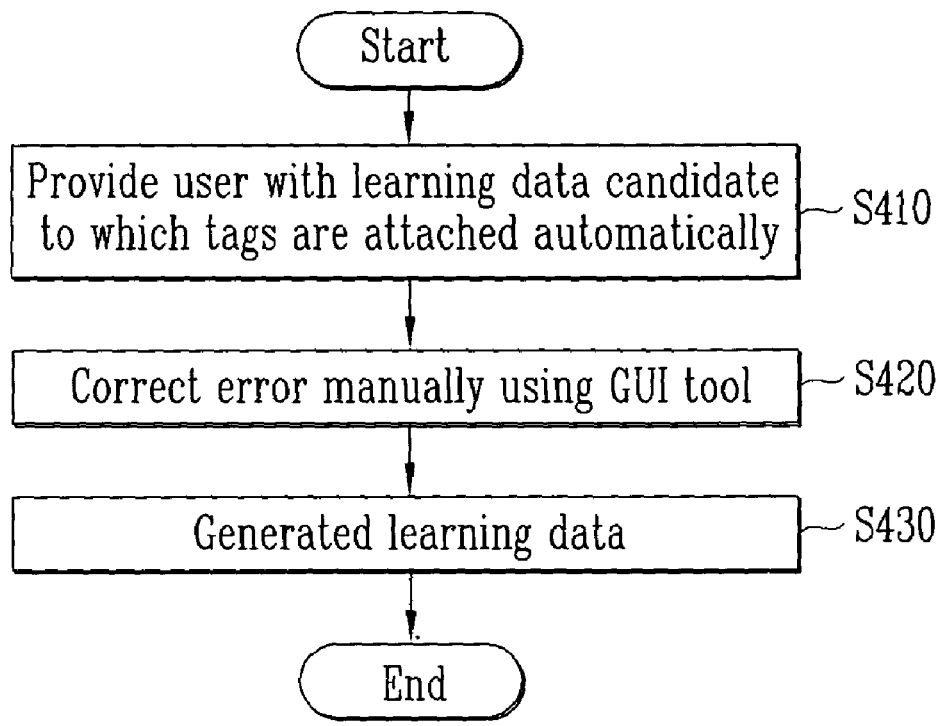
FIG. 6 is a flowchart illustrating detailed operations of a manual error correcting unit in the method for constructing learning data according to an exemplary embodiment of the present invention.

FIG. 6 is a flowchart illustrating detailed operations of a manual error correcting unit in a method for constructing learning data according to an exemplary embodiment of the present invention.

Referring to FIG. 6, first, when a specific learning data candidate generated automatically is provided to a user, in step S410, the user corrects an error manually using a GUI tool, in step S420.

Then, in step S430, the error-corrected learning data candidate is added to conventional learning data, in step S430.

The learning data added as above is input to a machine learning unit 10 to thereby generate new learning models, which enables auto tagging with higher accuracy.

Repetition of this process enlarges the quantity of the learning data constructed and heightens the accuracy of auto tagging.

Figure 8:
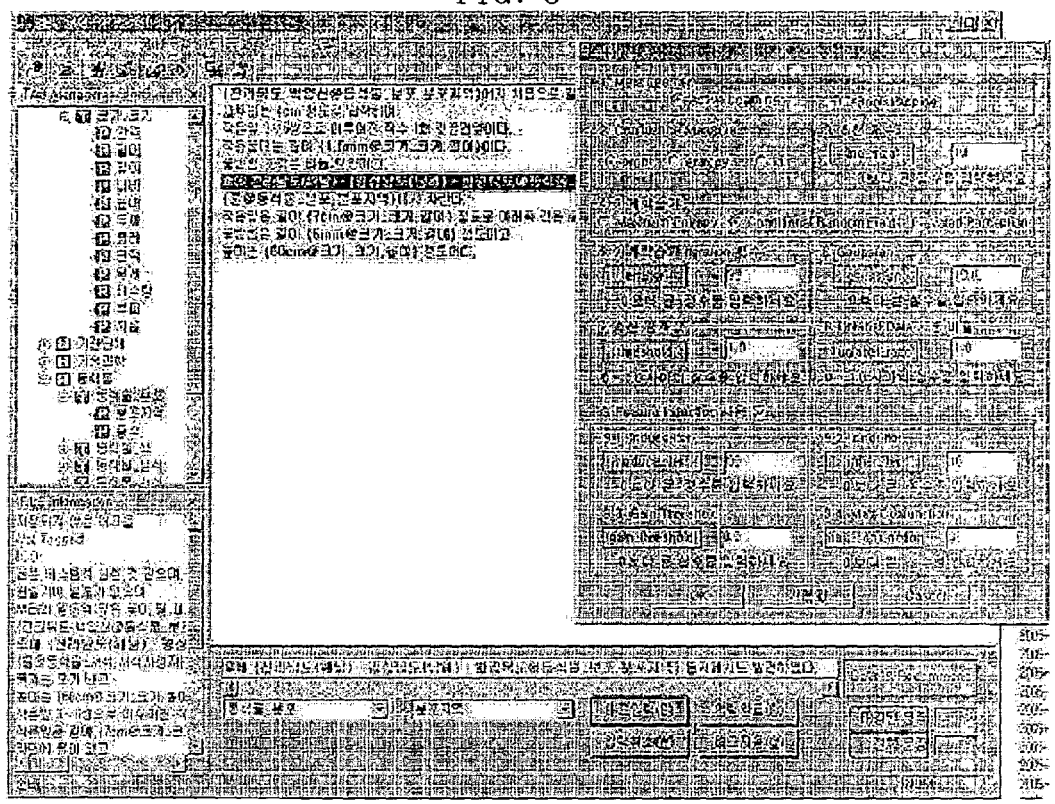
FIG. 8 illustrates an embodiment of an actual user interface for constructing learning data according to an exemplary embodiment of the present invention.

FIG. 8 is an embodiment of an actual user interface for constructing learning data according to an embodiment of the present invention.

As illustrated in FIG. 8, when a result tagged automatically is provided to a user, an error is corrected by the user, the error-corrected data is added to the learning data, and this process is repeated.

Through the above process, tags are attached to a raw corpus automatically using initial learning data to thereby generate learning data candidates, confidence scores are calculated, and a learning data candidate is selected. Also, the learning data is enhanced by correcting errors manually. Moreover, repetition of this process heightens the accuracy of auto tagging incrementally.

In addition, when the learning data candidate is selected using confidence scores, an active learning methodology or a bootstrapping methodology may be used. Further, when the active learning is used, high performance can be maintained with a small quantity of learning data.

Also, using incremental learning enables more rapid learning than using conventional batch learning.

As described above, an apparatus and method for constructing learning data according to the present invention reduces cost and time consumed in constructing learning data required for information retrieval, information extraction, translation, natural language processing, etc., using statistical information to enhance performance of auto tagging, and maintains high performance with a small quantity of learning data.

Also, learning time may be reduced by using incremental learning instead of conventional batch learning when performing machine learning.

While the present invention has been described with reference to exemplary embodiments thereof, it will be understood by those skilled in the art that various changes in form and detail may be made therein without departing from the scope of the present invention as defined by the following claims.

What is claimed is:

1. A method for constructing learning data, comprising the steps of:
   (a) generating learning models by performing machine learning with respect to learning data;
   (b) attaching tags to a raw corpus automatically using the generated learning models to thereby generate learning data candidates;
   (c) calculating confidence scores of the generated learning data candidates, and selecting a learning data candidate by using the calculated confidence scores; and
   (d) allowing a user to correct an error in the selected learning data candidate through an interface and adding the error-corrected learning data candidate to the learning data, thereby adding new learning models incrementally.

2. The method of claim 1, wherein steps (a) through (d) are repeated with respect to the added learning data.

3. The method of claim 1, wherein step (b) comprises the steps of:
   generating features from sentences included in the raw corpus;

determining an answer sentence after inferring a plurality of answers by adopting a plurality of learning models corresponding to the generated features and voting on them; and generating the learning data candidates by attaching tags to the determined sentence.

4. The method of claim 1, wherein step (c) comprises the steps of:

calculating the confidence scores of the learning data candidates automatically generated by using the plurality of inferred answers generated from the plurality of learning models; and selecting a specific learning data candidate by using the calculated confidence scores of the learning data candidates.

5. The method of claim 4, wherein the confidence scores of the learning data candidates are calculated by means of a committee-based method using the plurality of inferred answers provided by the plurality of learning models.

6. The method of claim 4, wherein selecting the specific learning data candidate is performed using an active learning method beginning with the candidate having the lowest confidence score, or a bootstrapping method beginning with the candidate having the highest confidence score.

7. The method of claim 1, wherein step (d) comprises the steps of:

allowing a user to correct an error using a Graphical User Interface (GUI) tool, when the specific learning data candidate is provided to the user; and generating initial learning models by adding the corrected learning data candidate to conventional learning data.

8. An apparatus for constructing learning data comprises:

an incremental learning unit generating new learning models from learning data by using machine learning;

an automatic tag attaching unit attaching tags to a raw corpus by using the generated learning models to thereby generate learning data candidates;

a learning data candidate selecting unit calculating confidence scores of the generated learning data candidates to thereby select a learning data candidate; and a manual error correcting unit providing the selected learning data candidate to a user and providing an interface to the user to correct an error.

9. The apparatus of claim 8, wherein the incremental learning unit generates features to be used in machine learning from the learning data, and then generates new learning models using incremental learning by means of the generated features.

* * * * *